US009756450B1

(12) United States Patent
Carrera et al.

(10) Patent No.: US 9,756,450 B1
(45) Date of Patent: Sep. 5, 2017

(54) AUTOMATED SETUP OF A STATION ON A WIRELESS HOME NETWORK

(71) Applicant: Quantenna Communications, Inc., Fremont, CA (US)

(72) Inventors: Marianna Carrera, San Jose, CA (US); Debashis Dash, Fremont, CA (US); Bahador Amiri, Saratoga, CA (US)

(73) Assignee: Quantenna Communications, INC., Fremont, CA (US)

( * ) Notice: Subject to any disclaimer, the term of this patent is extended or adjusted under 35 U.S.C. 154(b) by 0 days.

(21) Appl. No.: 15/247,905

(22) Filed: Aug. 25, 2016

Related U.S. Application Data

(60) Provisional application No. 62/210,383, filed on Aug. 26, 2015.

(51) Int. Cl.
*H04W 4/00* (2009.01)
*H04W 8/26* (2009.01)
(Continued)

(52) U.S. Cl.
CPC ........ *H04W 4/001* (2013.01); *G06K 7/10861* (2013.01); *H04L 43/12* (2013.01);
(Continued)

(58) Field of Classification Search
CPC ..... H04W 84/12; H04W 88/08; H04W 12/06; H04W 48/16; H04W 12/08; H04W 4/001;
(Continued)

(56) References Cited

U.S. PATENT DOCUMENTS 7,218,930 B2 5/2007 Ko et al.
7,860,485 B2 12/2010 Moore et al.
(Continued)

FOREIGN PATENT DOCUMENTS

WO WO2015012822 1/2015

OTHER PUBLICATIONS

"Wi-Fi Simple Configuration Technical Specification", Version 2.0. 5, Wi-Fi Alliance, 2014.
(Continued)

*Primary Examiner* — Daniel Lai
(74) *Attorney, Agent, or Firm* — IP Creators; Charles C Cary (57) ABSTRACT

A system for automating setup of a station on one among a plurality of wireless home networks each associated with a distinct subscriber and each including a wireless access point (WAP) node supporting wireless communications with an associated set of station nodes. A station provisioner circuit couples to the WAP nodes to acquire credentials for a new station prior to delivery to an identified one of the subscribers; and to inject the acquired credentials into a corresponding one of the WAP nodes which services the wireless network of the identified one of the subscribers. A secure link management circuit on the corresponding one of the WAP nodes utilizes the acquired credentials from the station provisioner circuit for identification of the new station shipped to the identified subscriber; and for setup of a secure wireless communication link between the new station and the corresponding WAP node which services the subscriber's wireless home network.

20 Claims, 6 Drawing Sheets

(51) Int. Cl.
  *H04L 12/26* (2006.01)
  *H04W 48/20* (2009.01)
  *G06K 7/10* (2006.01)
  *H04L 29/06* (2006.01)
  *H04W 84/12* (2009.01)
  *H04W 76/02* (2009.01)

(52) U.S. Cl.
  CPC ............ *H04L 63/08* (2013.01); *H04W 8/265* (2013.01); *H04W 48/20* (2013.01); *H04W 76/022* (2013.01); *H04W 84/12* (2013.01)

(58) Field of Classification Search
  CPC ... H04W 8/265; H04W 48/20; H04W 76/022; H04L 43/12; H04L 63/08; G06K 7/10861
  See application file for complete search history.

(56) References Cited

U.S. PATENT DOCUMENTS

| | | | |
|---|---|---|---|
| 7,941,122 | B2 | 5/2011 | Dowek et al. |
| 8,122,130 | B2 | 2/2012 | Shenfield et al. |
| 8,495,686 | B2 | 7/2013 | Maddali et al. |
| 8,533,461 | B2 | 9/2013 | Liu et al. |
| 8,713,589 | B2 | 4/2014 | Menezes et al. |
| 9,071,972 | B1 | 6/2015 | Wang et al. |
| 2004/0210450 | A1* | 10/2004 | Atencio ................. G06Q 40/12 705/30 |
| 2006/0236376 | A1 | 10/2006 | Liu et al. |
| 2008/0252419 | A1 | 10/2008 | Batchelor et al. |
| 2010/0008259 | A1* | 1/2010 | Yoon ..................... H04W 36/08 370/254 |
| 2010/0287582 | A1 | 11/2010 | Barnett, Jr. |
| 2011/0252439 | A1 | 10/2011 | Lai et al. |
| 2011/0306294 | A1* | 12/2011 | Yamazaki ............. H04W 48/20 455/41.1 |
| 2012/0017088 | A1 | 1/2012 | Liu et al. |
| 2013/0031225 | A1* | 1/2013 | Evans .................... H04L 67/36 709/221 |
| 2014/0057598 | A1 | 2/2014 | Steer et al. |
| 2014/0115624 | A1 | 4/2014 | Chen |
| 2014/0115718 | A1 | 4/2014 | Kellerman et al. |
| 2014/0137149 | A1 | 5/2014 | Liu |
| 2014/0259103 | A1 | 9/2014 | Gunasekara et al. |

OTHER PUBLICATIONS

Jie Luo, " QUALCOMM: Simple & Secure Wi-Fi Configuration for Internet of Things" Dec. 1, 2013; Electrical and Computer Sciences University of California Berkeley.

"Authentication Types for Wireless Devices ", 2009, Cisco Systems Inc.

* cited by examiner

FIG. 5    Process for Automated Station Setup

AUTOMATED SETUP OF A STATION ON A WIRELESS HOME NETWORK

CROSS REFERENCE TO RELATED APPLICATION

This application claims the benefit of prior filed Provisional Applications: No. 62/210,383 filed on Aug. 26, 2015 entitled "Cloud-Assisted Wi-Fi Device Self Install" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods multi-user concurrent communications with same.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device, a.k.a. station.

Adding a new station to an existing home network involves various forms of user involvement with both the WAP and the new station. The most prevalent standard setting forth the steps by which a user can initially pair and eventually associate a new station with the home network is set forth by the Wi-Fi Alliance in the Wi-Fi Simple Configuration (WSC/WPS) specifications. Pairing is the process that allows a specific Wi-Fi AP to provide valid credentials to a given Wi-Fi STA. WSC specifies three different methods for user pairing of a new station with their existing WAP: Push button; personal identification number (PIN) and near field communication (NFC).

WSC-Push Button requires the homeowner to press a physical or victual button on both WAP and station In a short time interval, e.g. two minutes. If both WAP and station see only one other device performing active WSC pairing the WAP will provide valid credentials to the STA, otherwise they abort the process. This method however trades security for simplicity, and it is considered by many Telco and device vendors not secure enough to be deployed on sensitive devices. The push button method can also lead to pairing to a neighbor's WAP by accident. In dense environments such as apartments where a station will have more than one WAP in range, and where the multiple WAPs are on different channels, the station will have to scan all channels to find the beacon of the WAP on which the button has been pushed, and if the scan is not quick enough the pairing will fail. Thus repeated pairing attempts may need to be made, which in turn may result in a temporary or permanent lockout, if either the station or WAP includes that feature.

WSC-PIN requires that a device identifier known as a PIN typically found on a label on the exterior of the new station be read by the homeowner and manually entered into the WAP by the user. If the subsequent wireless pairing attempt by the station includes a PIN matching that entered by the user into the WAP then the WAP will provide valid credentials to the station, otherwise they abort the process. The PIN is so short, e.g. 8 characters, as to be susceptible to simple cryptographic hacks. Additionally, the PIN entry can be frustrating if as is typically the case the WAP does not include its own input and display. A wired connection to the homeowner's computer is required, and further the entry into the browser on that computer of the WAPs local IP address to access the WAP's administrative page.

WSC-NFC requires that both the new station and WAP be plugged in and physically brought by the homeowner into temporary contact, e.g. "bumped", with one another at which time an extremely short range near field communication is used by the AP to provide valid credentials to the station.

What is needed are improved methods for setting up a wireless home network.

SUMMARY OF THE INVENTION

The invention provides a system for automating setup of a station on one among a plurality of wireless home networks each associated with a distinct subscriber and each including a wireless access point (WAP) node supporting wireless communications with an associated set of station nodes on a selected one of a plurality of communication channels.

In an embodiment of the invention the system comprises a station provisioner circuit and a secure link management circuit. The station provisioner circuit couples to the WAP nodes and is configured to acquire credentials for a new station prior to delivery to an identified one of the subscribers; and to inject the acquired credentials into a corresponding one of the WAP nodes which services the wireless home network of the identified one of the subscribers. The secure link management circuit on the corresponding one of the WAP nodes is configured to utilize the acquired credentials from the station provisioner circuit for identification of the new station shipped to the identified one of the subscribers; and for setup of a secure wireless communication link between the new station and the corresponding one of the WAP nodes which services the subscriber's wireless home network, thereby avoiding subscriber involvement in setting up the new station.

The Invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 2A-8 are combined system and interaction sequence views of alternate embodiments of the current invention for automated setup of a station on a wireless local area network in a home;

DETAILED DESCRIPTION OF THE EMBODIMENTS

Figure 1:
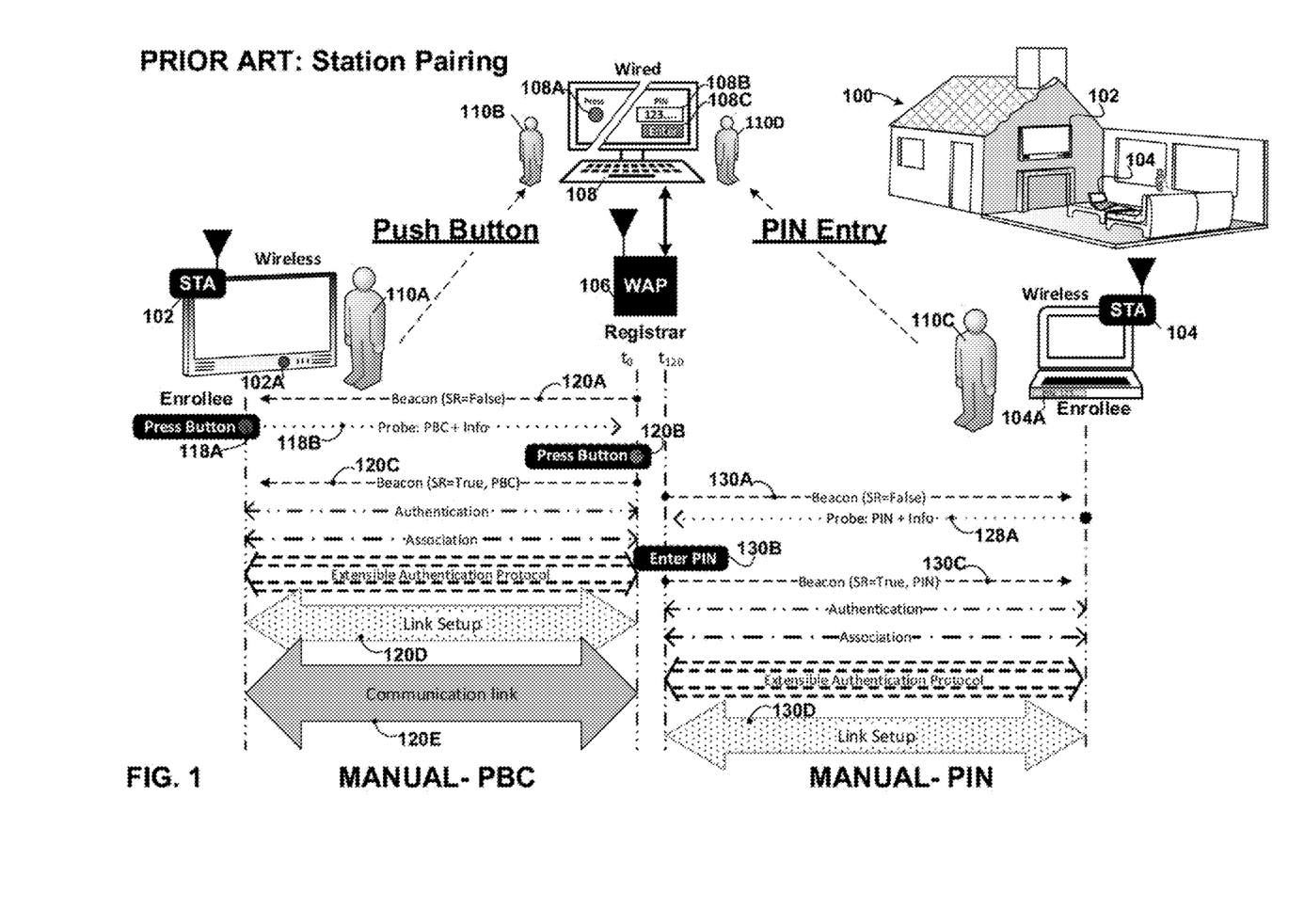
FIG. 1 is a combined system and interaction sequence view of a prior art approach requiring user involvement to set-up stations on a wireless local area network in a home.

FIG. 1 is a combined system and interaction sequence view of a prior art approach requiring user involvement to set-up stations on a wireless local area network in a home 100. The home includes a WAP 106, two stations 102 and 104 and a computer 108 coupled over a wired connection to the WAP which supports one or more of the IEEE 602.11 wireless protocols, e.g. "a", "b", "g". "n", "ac", "ad", "ax". Station 102 is a TV with wireless capability. Station 104 is a notebook computer with wireless capability. Two prior art methods of connecting a station to the WAP to form a wireless local area network (WLAN) in the home are shown. Each is set forth in a corresponding portion of the Wi-Fi Simple Configuration (WSC/WPS) technical specifications promulgated by the Wi-Fi Alliance. The WSC-Push Button interaction between the station 102 and the WAP 106 is shown on the sequence on the lower left side of the figure. The WSC-PIN interaction between the station 104 and the WAP 106 is shown on the sequence on the lower right side of the figure. In the terminology used in the WSC specification to describe the WLAN setup, each station is an 'Enrollee' and the WAP is the 'Registrar'.

WSC-Push Button configuration (PBC) requires the homeowner to press a physical or virtual button on both WAP and station in short time interval, e.g. two minutes. In FIG. 1 the HDTV 102 has a physical button 102A and the WAP 106 has a virtual button 108A. The WAPs virtual button 108A is only visible when the user has performed the following steps: a) opened a browser on computer 108 which has a wired connection to the WAP; b) entered the IP address of the WAP on the home WLAN, e.g. "192.168.0.nnn"; c) entered a user name and password to access an administrative webpage on the WAP; d) selected a target enrollee from a device list on that page, and e) pressed the virtual pushbutton 108A displayed on that page. The push button process requires user involvement and movement. The user moves to location 110A next to the TV and pushes its WPS button 102A, and then moves location 110B next to the Computer coupled to the WAP and after the login to the WAP described above presses the virtual push button 108A. If both WAP and station see only one other device performing active WSC pairing the WAP will provide valid credentials to the STA, otherwise they abort the process. The sequence of steps performed by WAP and station 102 for a PBC pairing includes the periodic transmission by the WAP of a beacon which indicates the WAPs capabilities, including in this example the capability to support WSC protocol. One of those WAP beacons 120A is shown, in which the WSC information element (IE) indicates that the selected registrar (SR) attribute is FALSE. The WSC-Push Button configuration may be initiated by either the station enrollee or the WAP registrar. In FIG. 1, the user at location 110A is shown initiating the WSC-Push Button configuration processes by pushing the WSC-Push button 102A on the enrollee station. In response to the press-button event 118A, the station's next transmitted probe request 118B includes a WSC information element (WSC-IE) in which the PBC flag is set. The WAP as registrar obtains device information from the enrollee station in the probe request including the trigger for push button pairing, a two-minute countdown timer is set. If, during that interval, the user moves to location 110B, and performs steps a-e listed above culminating in pressing the WAP's virtual push button 108A then the press button event 120B on the WAP triggers the WAPs active pairing with the selected enrollee station. The subsequent beacon 120C from the WAP confirms this activation by setting the SR attribute to TRUE and the WSC mode to PBC. The WAP may also include the station's MAC address in the authorized MAC sub elements in its beacon and probe response frames. Upon receipt of beacon 120C the station detects the WAP is in active PBC mode and both it and the WAP proceed through subsequent sequence of: authentication In which authentication frames are set to open, association in which encryption type is determined, and extensible authentication protocol (EAP) in which a cryptographic key is exchanged. At which the WSC setup is complete. Next the link is setup 120D using the shared secret, i.e. the cryptographic key, for corresponding reauthentication and reassociation steps. Next with the communication link 120E established between the station and WAP the communication of user data via uplinks and downlinks between the station 102 and the WAP can commence.

The WSC-PBC method trades security for simplicity, and it is considered by many Telco and device vendors not secure enough to be deployed on sensitive devices. The push button method can also lead to pairing to a neighbor's WAP by accident. In dense environments such as apartments where a station will have more than one WAP in range, and where the multiple WAPs are on different channels, the station will have to scan all channels to find the beacon of the WAP on which the button has been pushed, and if the scan is not quick enough the pairing will fail. Thus repeated pairing attempts may need to be made, which in turn may result in a temporary or permanent lockout, if either the station or WAP includes that feature.

WSC-PIN requires that a homeowner read a device identifier known as a PIN typically found on a label on the exterior of the new station be manually entered by the homeowner into the WAP. In FIG. 1 the notebook computer 104 has a PIN label 104A and the WAP 106 has an administrative page accessible via the computer 108 for entering the station's PIN. The WAPs administrative page including PIN input field 108B and submit button 108C is only visible when the user has performed the following, steps: a) opened a browser on computer 108 which has a wired connection to the WAP; b) entered the IP 1.5 address of the WAP on the home WLAN, e.g. "192.168.0.nnn"; c) entered a user name and password to access the administrative webpage on the WAP; d) selected a target enrollee from a device list on that page, and e) entered the PIN in field 108B and pressed the submit button 108C displayed on that page. The PIN entry process requires user involvement and movement. The user moves to location 110C next to the notebook computer 104 and reads the PIN label 104A, and then moves location 110D next to the computer coupled to the WAP and after the login to the WAP described above presses enters the PIN for the station in the PIN field 108B. If the subsequent wireless pairing attempt by the station includes the 8-character PIN matching that entered by the user into the WAP then the WAP will provide valid credentials to the station, otherwise they abort the process. The sequence of steps performed by WAP and station 102 for a PIN pairing includes the periodic transmission by the WAP of a beacon which indicates the WAPs capabilities, including in this example the capability to support WSC protocol. One of those WAP beacons 130A is shown, in which the WSC information element (IE) indicates that the selected registrar (SR) attribute is FALSE. The WSC-PIN configuration may be initiated by either the station enrollee or the WAP registrar. In FIG. 1, the user at location 110D is shown initiating the WSC-PIN configuration processes by submitting the WSC-PIN for the station on the registrar WAP 106. In response to the PIN entry 130B, the WAP's next transmitted beacon 130C confirms this activation by setting the SR attribute to TRUE and the WSC mode to PIN. The WAP may also include the station's MAC address in the authorized MAC sub elements in its beacon and probe response frames. Upon receipt of beacon 130C the station detects the WAP is in active PIN mode and both it and the WAP proceed through subsequent sequence of: authentication in which authentication frames are set to open, association in which encryption type is determined, and extensible authentication protocol (EAP) in which a cryptographic key is exchanged. At which the WSC setup is complete. The Enrollee station disassociates and reconnects, using its new WLAN authentication Credential. The link is setup 130D using the shared secret, i.e. the cryptographic key, for corresponding reauthentication and reassociation steps. Next with the communication link (not shown) established between the station and WAP the communication of user data via uplinks and downlinks between the station 104 and the WAP can commence.

The WSC-PIN method also trades security for simplicity, and it is considered by many Telco and device vendors not secure enough to be deployed on sensitive devices. The PIN is so short, e.g. 8 characters, as to be susceptible to simple cryptographic hacks, which then expose the longer cryptographic key exchanged during the final EAP sequence of the WSC. Additionally, PIN entry can be frustrating if as is typically the case the WAP does not include its own input and display. A wired connection to the homeowner's computer is required, and further the entry into the browser on that computer of the WAPs local IP address to access the WAP's administrative page.

Figure 2A:
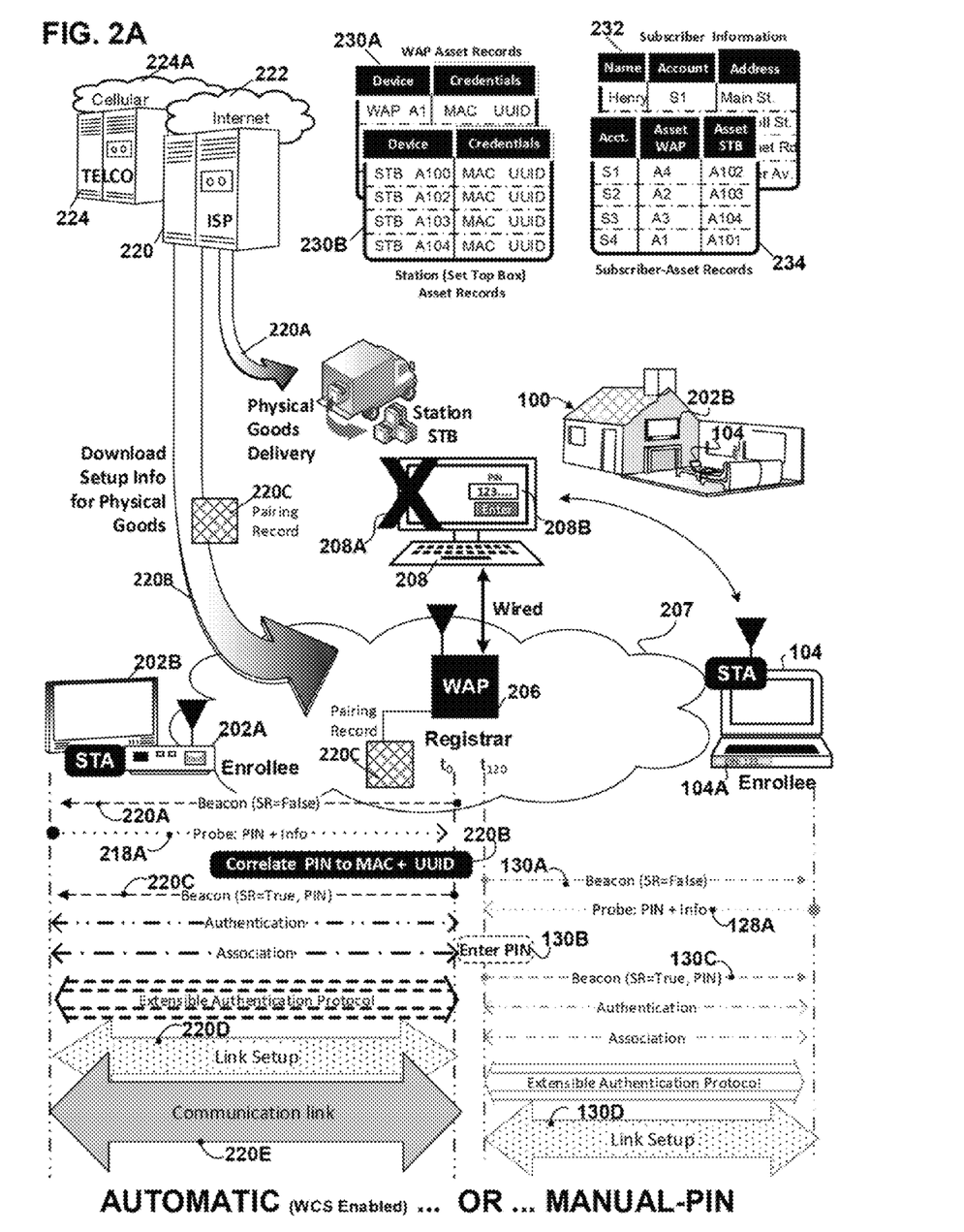
Figure 2B:
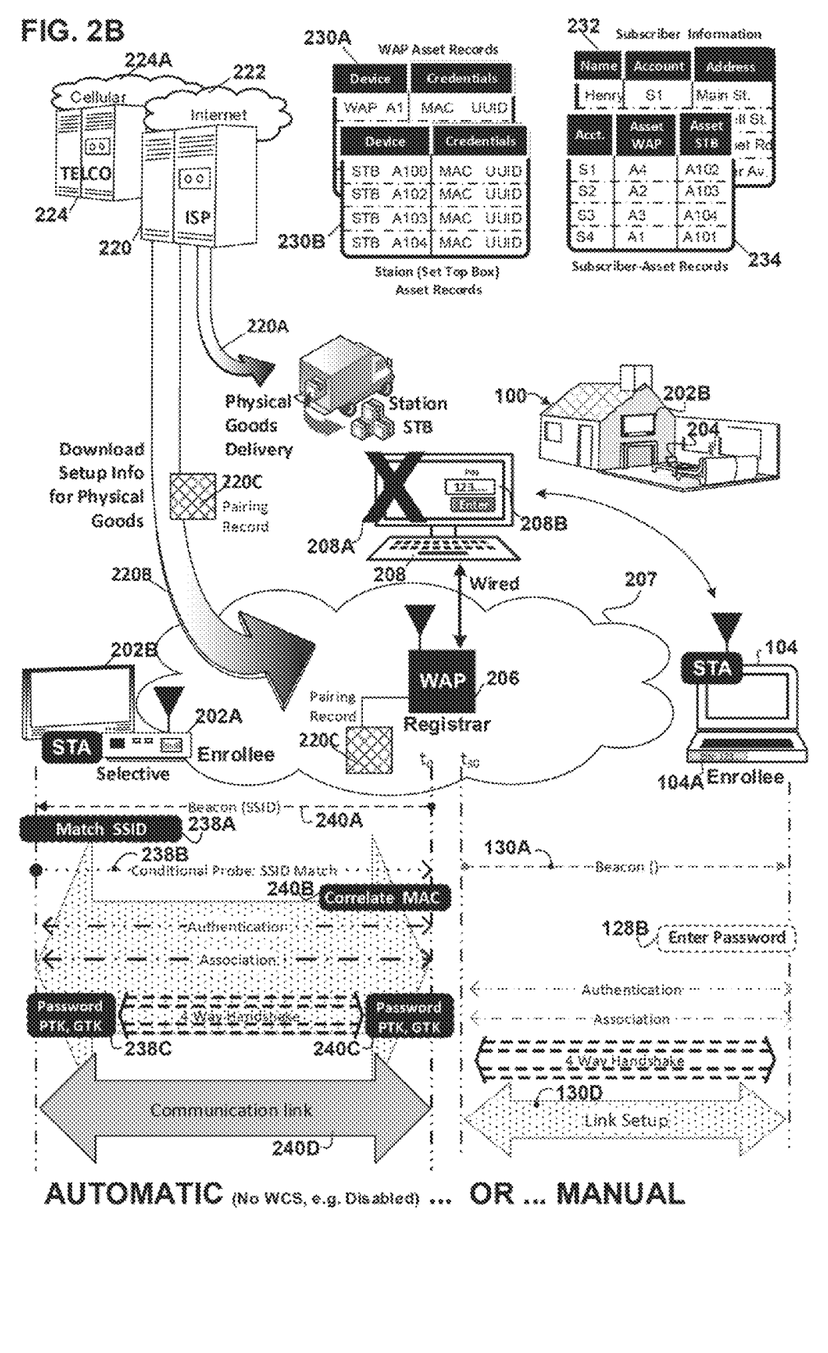

FIGS. 2A-B are combined system and interaction sequence views of alternate embodiments of the current invention for automated setup of a station on a wireless local area network 207 in the home 100. The home includes a WAP 206 coupled to computer 208, and two stations, i.e. a set top box 202A and a notebook computer 104. The set top box couples to the TV 202B. One of the stations, i.e. the set top box 202A, is delivered to the homeowner/subscriber from the ISP/Telco or trusted partner and is automatically paired with the WAP. In the case of FIG. 2A this automatic pairing occurs with WSC enabled, and in the case of FIG. 2B the automatic pairing occurs with WSC disabled. The other station in both FIGS. 2A-B, i.e. notebook computer 104 is paired using Prior Art manual pairing, e.g. WSC-PIN as discussed above in connection with FIG. 1. The automated interaction between the WAP and the set top box 202A is shown in the sequence on the lower left side of FIG. 2A and FIG. 2B. The user assisted interaction between the WAP and the notebook computer 104 is shown in the sequence on the lower right side of FIG. 2A and FIG. 2B.

In FIGS. 2A-2B a Telco 224 coupled to a cellular network 224A and an ISP coupled to the Internet 222 are shown. These may be the same entity, as is the case with AT&T or separate entities as is the case with AT&T and Comcast. In any event the ISP has an administrative/diagnostic connection 2208 with the WAPs in the homes of each of its subscribers. In the example shown, ISP 220 has an administrative connection with WAP 206. Subscriber's on a premium HDTV content delivery plan are provided with a set top box provided by the ISP, or one of its trusted vendors, or trusted partners. The subject invention exploits that relationship to provide for automated pairing of the set top box delivered to a subscriber.

The ISP maintains subscriber information records 232 which list the address of the home associated with each subscriber's account. The ISP also has asset records 230A-B for each WAP and any stations, e.g. set top box, that have been or will be delivered to a subscriber. The station asset records 230B contain the credentials for each station including for example, one or more of the serial number, medium access control (MAC) address, PIN, username, password, universally unique ID (UUID), cryptographic certificates, keys or other 'secrets'. The ISP also correlates these assets with each corresponding subscriber in subscriber-asset records 234.

In an embodiment of the invention the credentials for the new station are acquired by an optical character recognition (OCR) scan of the label on the new station or by electronic access (Read/Write) to the station's firmware. The credentials for the new station may be obtained directly by the ISP or one of the vendors in the ISP's supply chain. Alternately, the credentials for the new station may be obtained by a $3^{rd}$ party, such as an electronics store, which at time of purchase inputs the asset and customer information into the ISP's asset and subscriber databases via an API provided by the ISP.

The ISP uses these records to correlate the home to which a set top box is to be delivered, with the WAP which services that home. Thus, when a set top box is scheduled for delivery 220A to a subscriber, the ISP injects a pairing record 220C with the corresponding station credentials into the WAP that will service that station over its administrative connection 220B. In the example shown, that WAP is WAP 206. The injection/download of the pairing record may be proactive, e.g. timed to coincide with the delivery of the station to the home, or reactive to a request from the WAP after receiving a pairing request from a new station. In an embodiment of the invention the pairing record may include an "Install by date/time" to time limit the validity of the pairing record. The pairing record is used by the WAP to automate the pairing of the corresponding station, thereby avoiding user involvement in the setup of the station as well as any associated frustration.

In an embodiment of the invention both the ISP 220 and the Telco 224 integrate asset records and subscriber records to provide automated station setup capability for the subscriber's smartphone(s) within the subscriber's home WLAN. The Telco has asset records for each smartphone with its MAC and other acquired credentials and subscriber records for the associated individual owner of the smartphone. The ISP integrates these records with its own asset and subscriber records correlating Telco and ISP subscribers to each other, and adding the smartphone asset records to the existing ISP asset records 230B. A corresponding pairing record for each of the ISP subscriber's smartphones is then downloaded/injected into the corresponding WAP which services the subscriber's home WLAN, so that the smartphones are paired automatically onto the home WLAN.

In FIG. 2A the automated interaction between the WAP and the set top box 202A is shown in the sequence on the lower left side of FIG. 2A and FIG. 2B. WSC is enabled. The automated sequence of steps performed by WAP 206 and station 202A for an automated PIN pairing includes the periodic transmission by the WAP of a beacon which indicates the WAPs capabilities, including in this example the capability to support WSC protocol. One of those WAP beacons 220A is shown, in which the WSC information element (IE) indicates that the selected registrar (SR) attribute is FALSE. The new station, e.g. set top box, delivered by the ISP to the subscriber, transmits a probe request 218A and in step 2208 the WAP automatically correlates the station credentials in the probe request, e.g. the MAC address, with the injected pairing record 220C. Additionally, the WAP automatically triggers a change in its beacon's WSC IE SR attribute to TRUE and the WSC mode to PIN. No station PIN entry by the user into the WAP is required, as represented by the "X" 208A. Upon receipt of beacon 220C the station 202A detects the WAP is in active PIN mode and both it and the WAP proceed through subsequent sequence of: authentication in which authentication frames are set to open, association in which encryption type is determined, and extensible authentication protocol (EAP) in which a cryptographic key is exchanged. At which the WSC setup is complete. The Enrollee station 202A disassociates and reconnects, using its new WLAN authentication Credential. Next the link is setup 220D using the shared secret, i.e. the cryptographic key, for corresponding reauthentication and reassociation steps. Next with the communication link 220E established between the station and WAP the communication of user data via uplinks and downlinks between the station 202A and the WAP can commence.

In an embodiment of the invention the set top box 202A may, prior to delivery, be injected with the SSID and password of the WAP with which it is to be associated, as well as with any required firmware update required to limit the station's probe requests to the WAP which includes the matching SSID in its beacons. The ISP obtains this information from the WAP after correlating the purchaser of the set top box, with a corresponding subscriber account, and further with the WAP which services the WLAN associated with that account. This embodiment of the invention is practicable on new stations regardless of whether WSC is enabled or disabled. In terms of nomenclature a station with these capabilities is identified as 'selective' as to the WLAN's with which it will attempt to associate. A station without these capabilities is identified as 'promiscuous' since it may attempt to associate with any WLAN, regardless of the SSID associated therewith.

In FIG. 2A the user assisted interaction between the WAP and the notebook computer 104 is shown in the sequence on the lower right side of FIG. 2A and FIG. 2B. WSC is enabled. The WSC-PIN interaction between the enrollee station 104 and the registrar WAP 106 is identical to that discussed above in the manual WSC-PIN interaction shown in FIG. 1. User interaction requires the entry of station PIN 104A into a form field 208B on an administrative page of the WAP as displayed on computer 208, which has a wired connection directly to the WAP.

In FIG. 2B the automated interaction between the WAP and the set top box 202A is shown in the sequence on the lower left side of FIG. 2A and FIG. 2B. In this embodiment of the invention, WSC is disabled on the set top box. This improves the cryptographic security of the resultant link, by allowing a longer and hence more cryptographically secure pairing password than is provided by WSC, e.g. 34 bytes as opposed to the 8 byte WSC PIN. Additionally, the station is setup for selective association, i.e. with a WAP whose beacons include the matching SSID. The automated sequence of steps performed by WAP 206 and station 202A for an automated pairing includes the periodic transmission by the WAP of a beacon Which indicates the WAPs capabilities and SSID. One of those WAP beacons 240A is shown which indicates the SSID of the WLAN. The new station, e.g. set top box, delivered by the ISP to the subscriber, receives the beacon and if the beacon's SSID matches 238A the SSID pre-programmed into the station by the ISP prior to shipment, then the station 202A transmits a probe request 2388A and in step 240B the WAP automatically correlates the station credentials in the probe request, e.g. the MAC address, with the injected pairing record 2200. The station and the WAP proceed through subsequent sequence of: authentication in which authentication frames are set to open, association in which encryption type is determined, and extensible authentication protocol (AP) in which a cryptographic key is exchanged. Throughout the authentication and association, the WAP uses any other relevant station credentials in the pairing record, such as cryptographic keys, password, pairwise master or transient key (PMK/PTK), group wise master or transient key (GMK/GTK), to perform the authentication and association and 4-way handshake 238C, 240C. When the link setup is complete, the communication link 240D established between the station 202A and WAP supports uplinks and downlinks of user data.

In FIG. 2B the user assisted WSC-PIN interaction between the WAP and the notebook computer 104 is shown in the sequence on the lower right side of FIG. 2A and FIG. 2B. The Interaction between the enrollee station 104 and the registrar WAP 106 is shown. A WAP beacon 130A is shown. The user enters the WAP's password 128B into the station 104. The initial shared secret is the WAP's password read by the user from the WAP's label and entered into the station's wireless administration page. Once the user has manually shared this secret by entering it in the station, the WAP and station may proceed securely through subsequent steps of authentication, association, and 4 way handshake using WPA2 or other cryptographic security protocol. The Enrollee station disassociates and reconnects, using its new WLAN authentication Credential for link setup 130D. Once the link is setup is complete, uplink and downlink communications between the station 104 and the WAP 206 can commence securely.

Figure 3:
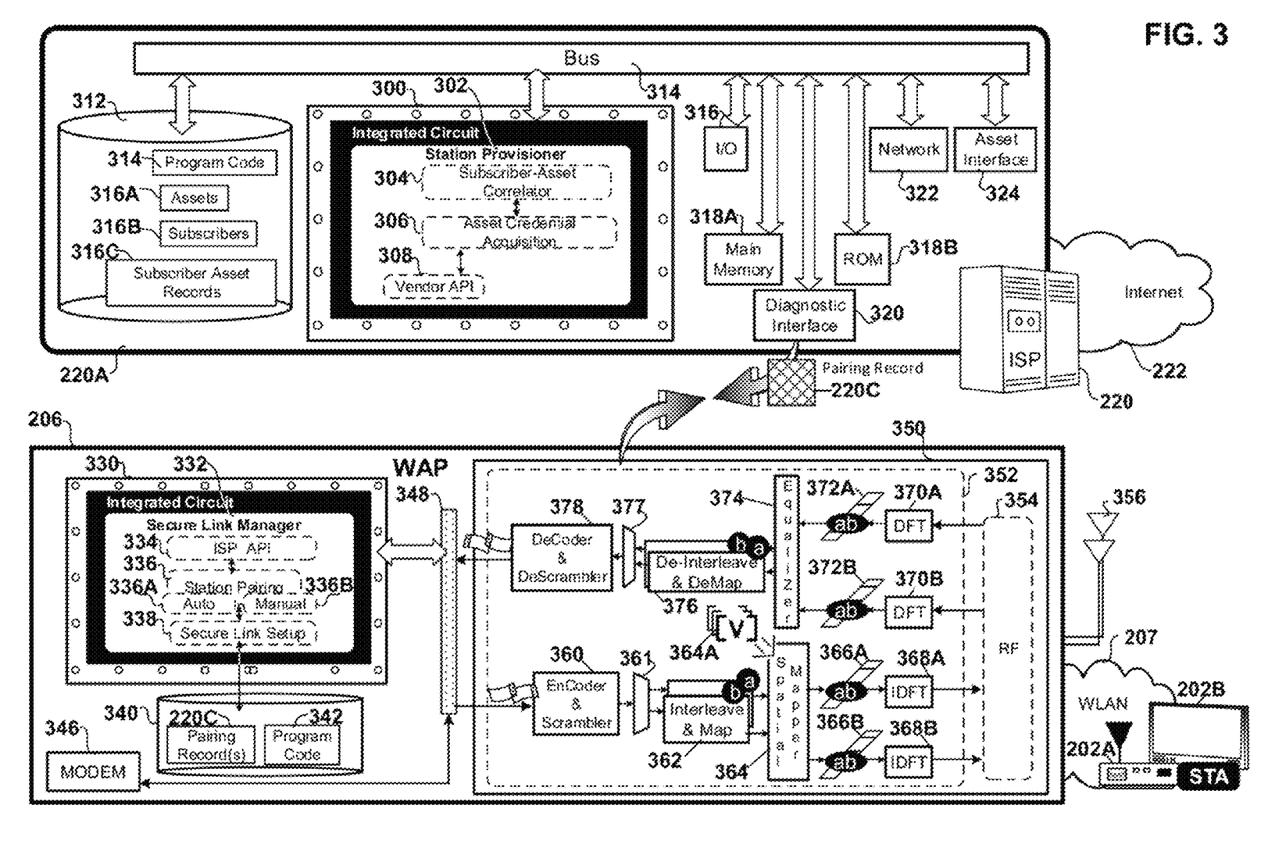
FIG. 3 is a detailed hardware block diagram of the system for automated setup of a station on a wireless local area network in a home.

FIG. 3 is a detailed hardware block diagram of the system for automated setup of a station on a wireless local area network in a home.

The ISP 220 includes a server 220A coupled to the Internet 222. The server includes an integrated circuit 300 and non-volatile storage 312; a bus 314, an input/output (I/O) module 316 for interfacing with an administrator, a network module 322 for coupling to a network, a main memory 318A for storing and executing program code 314 and data, a read only memory (ROM) 3188 for storing boot up program code. The server also includes an asset interface for acquiring credentials from a station before shipment to a subscriber and a diagnostic interface 320 for monitoring the WAPs in the subscriber residences serviced by the ISP. The integrated circuit 300 includes registers, clock, logic, and transistor gates for enabling the station provisioner 302 including executing associated program code 314 stored in non-volatile storage 312. The non-volatile storage also includes asset records 316A, subscriber records 316B and correlated subscriber-asset records 316C maintained by the station provisioner. The station provisioner includes: a subscriber-asset correlator 304, an asset credential acquisition module 306 and a vendor API. The subscriber-asset correlator 304 correlates the purchaser of the new station with an existing Telco or ISP subscriber and the WAP which services their wireless home network, and injects a pairing record 220C including acquired credentials for the new station, into the WAP. The asset Credential acquisition module, acquires credentials for a new station prior to shipment to the identified one of the subscribers. The acquisition of station security credentials may be performed by the Telco/ISP directly, or by a member of their vendor supply chain, or by the trusted partner responsible for the sale of the new station, e.g. set top box. Station security credentials may be acquired by reading them from a label on the exterior packaging or housing of the new station using a scanner with optical character recognition (OCR) capability. Station credentials may also be read from the station's internal firmware using a temporary electronic coupling to the station's external ports/interfaces. In another embodiment of the invention the security credentials are acquired concurrently with writing them electronically into the non-volatile firmware, e.g. the BIOS, of the station before shipment to the purchaser. The vendor API manages access to the station provisioner by the ISP's trusted partners.

FIG. 3 also shows one WAP 206 of the plurality of WAPs serviced by the ISP 220. WAP 206 provides wireless connectivity to the Internet via WLAN 207 within the corresponding subscriber's home. WAP 206 supports communications with each associated station, e.g. set top box 202A. The WAP in this embodiment of the invention is identified as a 2×2 WAP supporting as many as 2 discrete communication streams "a", "b" over two antennas 356. The WAP in this embodiment of the invention supports multiple-input multiple output (MIMO) communications. In alternate embodiments of the invention the WAP may not support MIMO, and may have a single antenna. The WAP in this embodiment of the invention supports orthogonal frequency division multiplexed (OFDM) communications. In alternate embodiments of the invention the WAP may not support OFDM, and may communicate on a single communication channel.

The subject 2×2 WAP includes: integrated circuit 330 and non-volatile storage 340; a bus 348, a WLAN stage 350 including a base band stage 352, a radio frequency (RF) stage 354 and antennas 356. The WAP RF stage supports one or more IEEE 802.11 wireless local area network (WLAN) protocols. The WAP also includes a cable or DSL modem 346 for coupling via fiber or copper to the Internet Service Provider (ISP) 220. The integrated circuit 330 includes registers, clock, logic, and transistor gates for enabling the secure link manager 332 including executing associated program code 342 stored in non-volatile storage 340.

Transmission of communication packets to a station, e.g. set top box 202A begins in the baseband stage 352. Each outgoing packet is encoded and scrambled in encoder scrambler module 360 and may be de-multiplexed into more than one stream. In the example shown, the outgoing communication is demultiplexed into two streams in demultiplexer 361. Each stream "a", "b" is subject to interleaving and constellation mapping in an associated interleaver mapper 362 and passed to the spatial mapper 364. The spatial mapper uses a beamsteering matrix 364A determined from a sounding of the link with station 1202A to steer subsequent communications thereto. The beamsteering matrix specifies specific phase and amplitude adjustments for the communications on each antenna designed to steering the outgoing communications toward the recipient station. There is a discrete beamsteering matrix for each of the OFDM tones or sub-channels. The combined streams "ab" are injected into each of the OFDM tones or sub-channels 366A-B of the inverse discrete Fourier Transform (IDFT) modules 368A-B respectively. Each IDFT module is coupled via associated upconversion circuitry in the RF stage 354 to an associated one of the pair of antenna 356.

Reception of communication packets from a station, e.g. set top box 202A begins in the RF stage 354. In the RF Stage received communications "ab" on each of the two antenna 356 from station 202A are downconverted and supplied as input to the baseband stage 352. In the baseband stage the received communications are then transformed from the time to the frequency domain in the discrete Fourier Transform (DFT) modules 370A-B from which they are output as discrete orthogonal frequency division multiplexed (OFDM) tones/sub-carriers/sub-channels 372A-B. All received streams are then subject to equalization in equalizer 374. Received steam(s) "ab" are subject to de-interleaving and constellation demapping in associated deinterleaver demapper modules 376, followed by multiplexing in multiplexer 377. The received, data "ab" is decoded and descrambled in decoder descrambler 378.

The integrated circuit 330 includes registers, clock, logic, and transistor gates for enabling the secure link manager 332 including executing associated program code 342 stored in non-volatile storage 340. The non-volatile storage also includes one or more pairing records 220C injected by the ISP 220. The secure link manager includes: an ISP API 334, a station pairing module 336 with automatic and manual pairing submodules 336A, 336B respectively, and a secure link setup module 338. The ISP API-couples the WAP to the diagnostic interface 320 of the ISP 220. The station pairing module 336 handles both: a) the automatic secure pairing of a station for which there is a corresponding pairing record 220C injected by the station provisioner of the ISP 220 via auto pairing sub-module 336A, as well as b) the manual secure pairing of a station for which there is not a pairing record via manual pairing sub-module 336B. Manual pairing capability includes support for pairing protocols such as: WiFi WSC: PIN, PBC, NFC; as well as manual pairings with WSC disabled. Thus the station pairing module 336 supports both automatic pairing without any homeowner involvement of a station for which there is a pairing record together with manual pairing of another station which manual pairing requires homeowner involvement in the pairing, e.g. WiFi WSC PIN/PBC/NFC. The secure link setup module supports the protocols associated with secure setup of each link accepted by the station pairing module for pairing, regardless of the type of pairing, i.e. automatic or manual. Representative ones of those protocols are shown on the lower left and lower right sides of FIGS. 2A-2B as discussed above.

In an embodiment of the invention the new wireless station itself, e.g. set top box, may be configured with its own integrated circuit including: registers, clock, logic, and transistor gates for enabling a selective association module including executing associated program code which makes station probe requests to an active WLAN conditional on a match between an SSID injected into the station before shipment with the SSID broadcast by a WAP in each WAP beacon.

Figure 4:
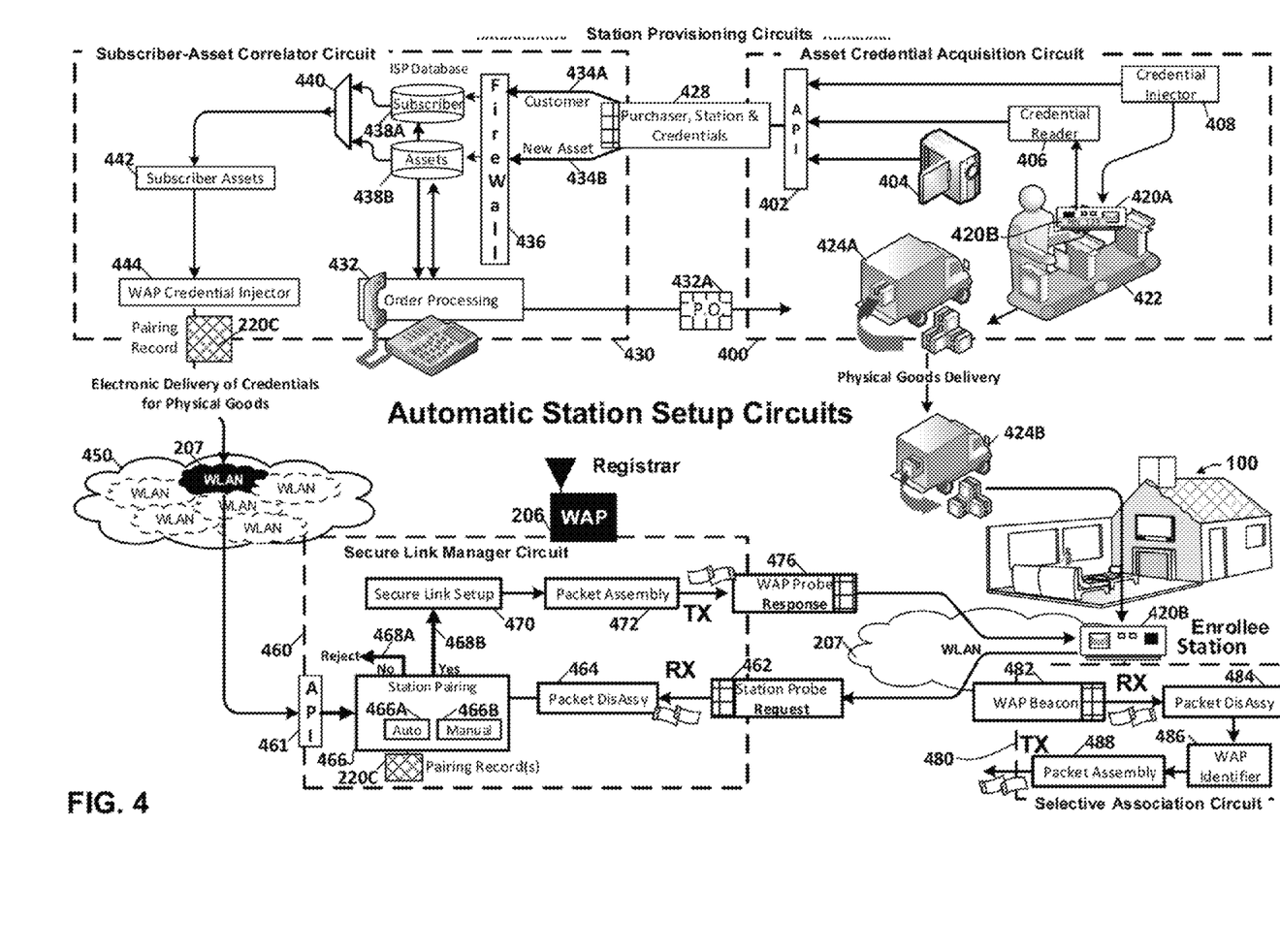
FIG. 4 is a detailed circuit diagram of the circuits for automated setup of a station on a wireless local area network in a home.

FIG. 4 is a detailed circuit diagram of the circuits for automated setup of a station on a wireless local area network in a home.

The station provisioning circuits on the ISP and or one or more of its trusted partners include: the asset credential acquisition circuit 400, and the subscriber-asset correlator circuit 430. The asset credential acquisition circuit 400 includes one or more of: a label scanner 404, a credential reader 406, and a credential injector 408. These sub-circuits acquire security credentials from each new set top box or other station type, before delivery to a subscriber's home and pass the acquired credentials via API 402 to the subscriber-asset correlator circuit 430. A purchase order 432A is received for a new set top box 420A from the ISP or trusted partner's order processing unit 432. In an embodiment of the Invention the purchase order includes the SSID of the WLAN of the subscriber to whose home the set top box will be shipped. The SSID may be listed in a field in a corresponding one of either the subscriber or WAP asset records in tables 438A-B respectively. The set top box 420A is shown being boxed at the end of a production line 422 after which it will be picked up 424A and delivered 424B at the home 100 of a targeted subscriber. The label scanner 404 includes built in optical character recognition (OCR) capability to acquire security credentials from a label 420B on the exterior housing or packaging of the set top box prior to shipment. The credential reader 406 includes a cable for connecting to one of the set top box ports and reading the credentials from the internal firmware on the STB. The credential injector 408 generates credentials and injects them into the firmware on the STB, via a cable connection to one of the set top box ports. The acquired station credentials include, in an embodiment of the invention: the serial number, medium access control (MAC) address, PIN, username, password, or a universally unique ID (UUID). Station credentials may also include: cryptographic certificates, keys or other 'secrets' to be shared with the WAP. In still another embodiment of the Invention the acquired station credentials may include the unique SSID of the WAP which services an identified subscriber's wireless home network, as determined by the subscriber-asset correlator circuit and as passed back to the asset credential acquisition circuit for injection into the station via the credential injector 408.

The subscriber-asset correlator circuit 430 accepts the electronic delivery of the bill of lading (B/L) 428 from the asset credential acquisition circuit. The bill of lading identifies the purchaser, the delivery address, the station, and the acquired station credentials. After passage through an internal firewall 436, the bill of lading is parsed by the order processing unit 432 into customer 434A and new asset 434B portions. The customer to whom the set box is to be delivered is identified as one of the ISP's subscribers. Corresponding updates or additions are made to the ISP's existing subscriber and asset tables 438A-B respectively. A combined 440 subscriber record and asset record 442 is then generated and passed to the WAP credential injector 444. The WAP credential injector identifies which among the millions of distinct WLANs 450 under management is servicing the subscriber listed in the combined subscriber asset record 442. Once that WLAN and its associated WAP is identified the WAP credential Injector injects a pairing record 220C into the WAP through its existing diagnostic link to that WAP. The pairing record contains the acquired credentials for the new station 420B being delivered to the subscriber. In the example shown the identified WLAN is WLAN 207 and the corresponding WAP servicing that WLAN is WAP 206.

The secure link management circuit 460 on WAP 206 receives the injected pairing record 220C via the ISP's existing diagnostic API 461. When the WAP receives a probe request from a station, e.g. probe request 462, it demodulates the received probe packet in its receive path RF and baseband circuits described above in FIG. 3. Then a packet disassembler 464 passes the probe packet to the station pairing circuit 466. The automatic pairing sub-circuit 466A thereof determines whether the station credentials in the probe request match those of an existing pairing record, e.g. pairing record 220C. If they do, then control passes 468B to the secure link setup circuit 470. If there is no pairing record matching the credentials in the station's probe request, then control passes to the manual pairing sub-circuit 466B. The manual pairing sub-circuit includes support for pairing protocols such as: WiFi WSC as well as manual pairings with WSC disabled. If the manual pairing of the station making the probe request succeeds, then control is again passed 468B to the secure link setup circuit 470. Alternately, if either auto or manual pairing fails at any initial probe or subsequent phase of the related protocol then the pairing is rejected 468A. The secure link setup circuit 470 supports cryptographic setup of the link with the paired station, in a number of protocols including WPS, WPA/WPA2 for example. The packet assembler 472 packetizes the probe response, authentication, association, and EAP or 4-way handshake packets associated with the relevant protocol. The packets are then modulated in the baseband and RF transmit path components described above in FIG. 3, and transmitted to the corresponding station, e.g. set top box 420B. A WAP probe response packet 476 is shown being transmitted by the WAP to station 420B.

FIG. 4 also shows an embodiment of the invention where the station includes a selective association circuit. This embodiment of the invention improves security by making the station selective rather than promiscuous in terms of the WAPs with which it can associate. The circuit requires for its operation the injection into the new station prior to shipment by the asset credential acquisition circuit 400 of station credentials which include the SSID of the identified subscriber's WLAN on which the station will be installed. In this embodiment of the invention the selective association circuit includes on its receive path a packet disassembler 484 which disassembles a received WAP beacon packet 482 and passes it to the WAP identifier 486. The WAP identifier compares an injected station credential SSID with the SSID in the received beacon packet 482. If there is a match between the injected SSID and the beacon SSID then the packet assembler 488 transmits a probe request, e.g. probe request 462 to the WAP to initiate the secure pairing process.

Figure 5:
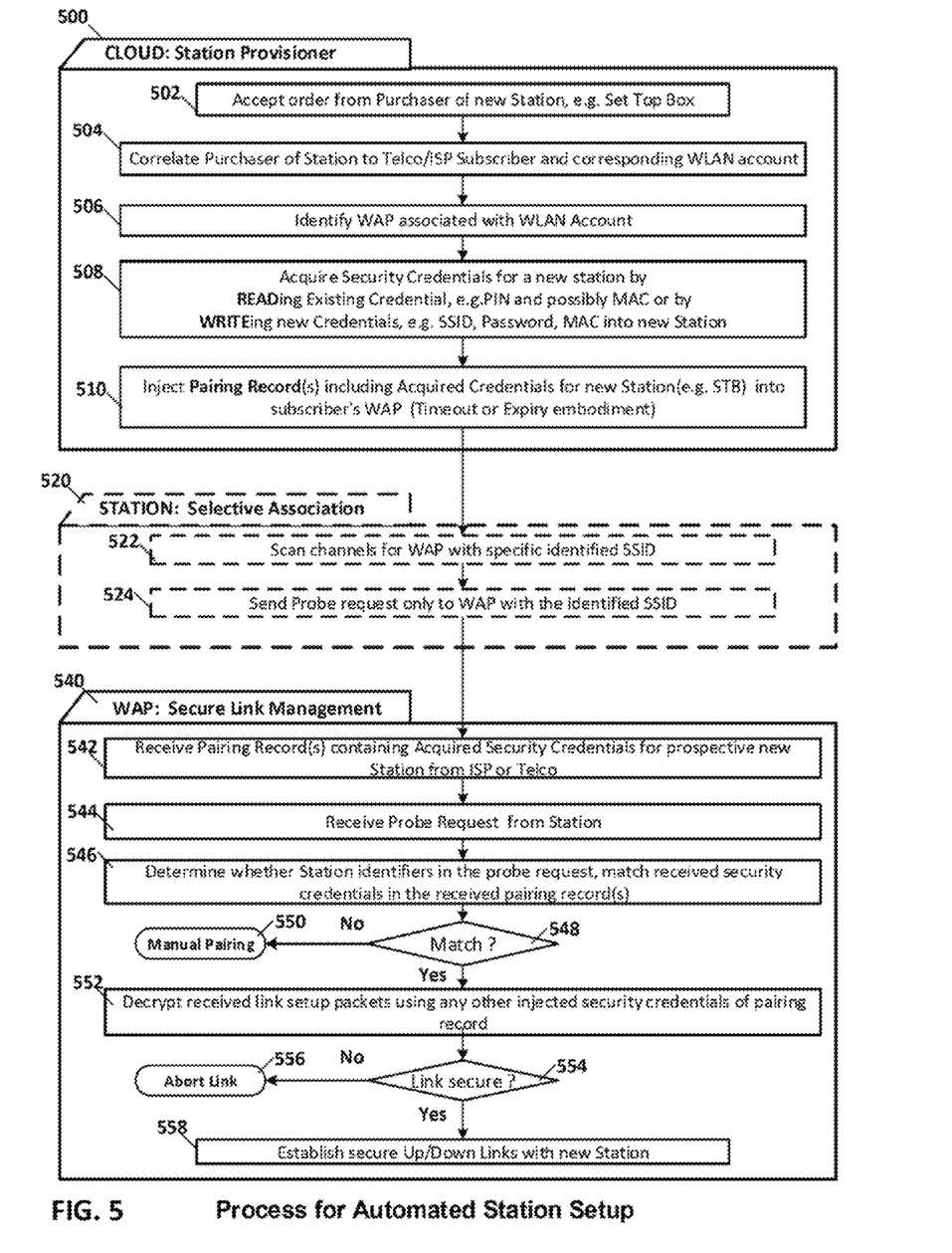
FIG. 5 is a process flow diagram of processes associated with automated setup of a station on a-wireless local area network in a home.

FIG. 5 is a process flow diagram of processes associated with automated setup of a station on a wireless local area network in a home. A station provisioning block 500 of processes performed in the "cloud" is shown. A secure link management block 540 of processes performed on the WAP are shown. An optional selective association block 520 of processes performed on a new station are shown.

The Station provisioning block of processes 500 commences with the acceptance of an order from a purchaser of a new station, e.g. a set top box, in process 502. Next in process 504 the purchaser of the new station is correlated with an existing Telco or ISP subscriber and their corresponding WLAN account. A scenario in which this correlation can take is the purchase of a set top box by a Telco/ISP subscriber from the Telco/ISP itself. For example, a Comcast/AT&T subscriber orders a set top box from Comcast/AT&T directly. Another scenario in which this correlation can take is the purchase of a set top box from a trusted partner of a Telco/ISP by a customer who is also a Telco/ISP subscriber. Point of purchase information on the customer and set top box is provided by the trusted partner to the Telco/ISP which then allows the Telco/ISP to perform the correlation. Next in process 506 the Telco/ISP identifies the WAP associated with the subscriber's WLAN account is identified. Identification includes in an embodiment or the invention the service set identifier (SSID) associated with the WAP.

Next in process 508 the security credentials for the new station are acquired. Acquired station credentials may include for example: the serial number, medium access control (MAC) address, PIN, username, password, or a universally unique ID (UUID). Station credentials may also include cryptographic certificates, keys or Other 'secret' to be shared with the WAP. The acquisition of station security credentials may be performed by the Telco/ISP directly, or by a member of their vendor supply chain, or by the trusted partner responsible for the sale of the new station, e.g. set top box. In an embodiment of the invention the security credentials are acquired by reading them from the new station. Station security credentials may be read from a label on the exterior packaging or housing of the new station. Reading of these credentials may be accomplished with an optical character reader (OCR) from the label on the exterior packaging or housing of the new station. Station credentials may also be read from the station's internal firmware using a temporary electronic coupling to the station's external ports/interfaces. In another embodiment of the invention the security credentials are acquired concurrently with writing them electronically into the non volatile firmware, e.g. the BIOS, of the station before shipment to the purchaser. In an embodiment of the invention the credentials injected into the station may include the SSID of the WAP and WLAN with which the new station is expected to selectively associate, if that SSID was previously determined in process 506. Next in process 510 a pairing record including the acquired security credentials for the new station, e.g. set top box, is injected into the corresponding one of the WAP nodes which services the subscriber's wireless home network. The pairing record may also include a start and or expiry date and or time. Next control is either passed to the optional selective association block 520 of processes which may be performed on the new station or directly to the secure link management block 540 of processes performed on the WAP.

The optional selective association block 520 of processes which may be performed on a new station begin with process 522. In process 522 the station scans the plurality of WiFi channels for a transmitted WAP beacon which includes an SSID which matches any SSID injected into the station in process 508. In process 524 the station transmits probe requests only to a WAP whose transmitted beacons include the matching SSID. Next control is passed to the secure link management block 540 of processes.

The secure link management block 540 of processes are performed on the subscriber's WAP. In process 542 the pairing record(s) containing the acquired security credentials for the prospective new station from the ISP or Telco are received. Then in processes 544-546 any probe requests that are received by the WAP from a station are comp red with any existing pairing record(s) to determine whether station identifiers in the probe request match the received security credentials in the injected pairing record(s). Next, in decision process a determination is made as to whether station identifiers in the probe request match the credentials in any injected pairing record. If not, then control is passed to traditional manual pairing processes 540 such as the WSC processes shown in FIG. 1, and further automatic paring is aborted. If the probe request does have identifiers which match the credentials in an injected pairing record, then control is passed to process 552. In process 552 any other injected security credentials of the subject pairing record which are relevant to further sets in link setup, including link setup packet decryption are utilized for decryption/encryption the link setup packet(s) between the new station and the WAP. Next in decision process 554 a determination is made as to whether the link setup is secure. If it is not, as evidenced for example by a failure of encryption or decryption due to non-matching cryptographic keys, then link setup is aborted in process 556. Alternately, if a secure link is established between the new station and the WAP then control is passed to process 558. In process 558 secure uplink and downlink communications between the station and the WAP are established.

The components and processes disclosed herein may be implemented a software, hardware, firmware, or a combination thereof including program code software, a memory element for storing the program code software and a hardware processor including registers, logic, and transistor gates for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A system for automating setup of a station on one among a plurality of wireless home networks each associated with a distinct subscriber and each including a wireless access point (WAP) node supporting wireless communications with an associated set of station nodes on a selected one of a plurality of communication channels; and the system comprising:
    a station provisioner circuit coupled to each of the WAP nodes servicing the plurality of WLANs and configured to acquire credentials for a new station prior to delivery to an identified one of the subscribers; and to inject the acquired credentials into a corresponding one of the WAP nodes which services the wireless home network of the identified one of the subscribers; and
    the corresponding one of the WAP nodes including:
        a secure link manager circuit configured to utilize the acquired credentials from the station provisioner circuit for identification of the new station shipped to the identified one of the subscribers; and for setup of a secure wireless communication link between the new station and the corresponding one of the WAP nodes which services the subscriber's wireless home network, thereby avoiding subscriber involvement in setting up the new station.

2. The system of claim 1, wherein the station provisioner circuit further comprises:
    an optical scanner configured to acquire credentials for the new station by scanning a label on the new station which includes said credentials.

3. The system of claim 1, wherein the station provisioner circuit further comprises:
    a credential generation circuit which generates credentials for each new station; and
    a credential injection circuit injecting the new credentials generated by the credential generation circuit into the new station prior to shipment.

4. The system of claim 1, further comprising:
the station provisioner circuit further configured to inject a service set identifier (SSID) of the subscriber's wireless home network into the new station prior to shipment; and
the new station including a selective association circuit utilizing the SSID injected by the station provisioner circuit to limit the new station's wireless local area network (WLAN) association exclusively to the subscriber's wireless home network.

5. The system of claim 1, wherein the station provisioner circuit further comprises:
a subscriber-asset correlator circuit configured to correlate an order for the new station from the subscriber, with the corresponding one of the WAP nodes which services the subscriber's wireless home network.

6. The system of claim 1, wherein the secure link manager circuit further comprises:
a packet disassembler sub-circuit to obtain station credentials in a probe request from a station seeking to associate with the identified one of the WAP nodes; and
a station identifier sub-circuit to identify whether or not to setup a secure link with the station based on the credentials obtained by the packet disassembler.

7. The system of claim 1, wherein the secure link manager circuit further comprises:
a packet disassembler sub-circuit to obtain station credentials in a probe request from a station seeking to associate with the identified one of the WAP nodes; and
a station identifier sub-circuit responsive to the credentials obtained by the packet disassembler to request from the station provisioning circuit the injection of any relevant acquired credentials for the new station, and to identify whether to setup a secure link with the station based on whether the credentials obtained by the packet disassembler match the credentials provided by the station provisioning circuit.

8. The system of claim 1, wherein the secure link manager circuit further comprises:
a secure link setup circuit configured to utilize the acquired credentials from the station provisioner circuit to setup a secure communication link with the new station based on at least one of a: WIFI protected setup (WPS) protocol, or a Wi-Fi protected access (WPA/WPA2) protocol.

9. The system of claim 1, wherein the acquired credentials for the new station acquired by the station provisioner circuit into the corresponding one of the WAP nodes, include at least one of: a Personal Identification Number (PIN), a password, a username, a service set identifier (SSID) of the subscriber's wireless home network, a universally unique identifier (UUID), a medium access control (MAC) address of the station, or a MAC address of the subscriber's WAP.

10. The system of claim 1, wherein the new station comprises at least one of: a set-top box, a repeater, a tablet, a gaming console, or a phone.

11. A method for automating setup of a station on one among a plurality of wireless home networks each associated with a distinct subscriber and each including a wireless access point (WAP) node supporting wireless communications with an associated set of station nodes on a selected one of a plurality of communication channels; and the method comprising:
acquiring credentials for a new station prior to delivery to an identified one of the subscribers;
injecting the acquired credentials into a corresponding one of the WAP nodes which services the wireless home network of the identified one of the subscribers;
identifying on the corresponding one of the WAP nodes, the new station shipped to the identified one of the subscribers based on the injected acquired credentials; and
setting up a secure wireless communication link between the new station and the corresponding one of the WAP nodes which services the subscriber's wireless home network utilizing the injected acquired credentials, thereby avoiding subscriber involvement in setting up the new station.

12. The method of claim 11, wherein the acquiring act further comprises:
scanning a label on the new station which includes said credentials.

13. The method of claim 11, wherein the acquiring act further comprises:
generating credentials for each new station; and
injecting the new credentials generated in the generating act into the new station prior to shipment.

14. The method of claim 11, further comprising:
injecting the acquired credentials and further a service set identifier (SSID) of the subscriber's wireless home network into the new station prior to shipment; and
limiting the new station's wireless local area network (WLAN) association requests exclusively to the subscriber's wireless home network, responsive to the SSID injected in the injecting act.

15. The method of claim 11, wherein the injecting act further comprises:
correlating an order for the new station from the subscriber, with the corresponding one of the WAP nodes which services the subscriber's wireless home network.

16. The method of claim 11, wherein the identifying act further comprises:
obtaining station credentials from a probe request from a station seeking to associate with the identified one of the WAP nodes; and
a station identifier sub-circuit to identify whether or not to setup a secure link with the station based on the credentials obtained in the obtaining act.

17. The method of claim 11, wherein the identifying act further comprises:
obtaining station credentials in a probe request from a station seeking to associate with the identified one of the WAP nodes;
requesting the injection of any relevant acquired credentials for the new station responsive to the credentials obtained in the obtaining act; and
identifying whether to setup a secure link with the station based on whether the credentials obtained in response to the request for injection match the credentials obtained from the probe request.

18. The method of claim 11, wherein the act of setting up a secure wireless communication link further comprises one of the acts of:
setting up a secure link utilizing a WiFi protected setup (WPS) protocol, and
setting up a secure link with the new station utilizing a WiFi protected access (WPA/WPA2) protocol.

19. The method of claim 11, wherein the credentials for the new station acquired in the acquiring act, include at least one of: a Personal Identification Number (PIN), a password, a username, a service set identifier (SSID) of the subscriber's wireless home network, a universally unique identifier (UUID), a medium access control (MAC) address of the station, or a MAC address of the subscriber's WAP.

20. The method of claim 11, wherein the new station comprises at least one of: a set-top box, a repeater, a tablet, a gaming console, or a phone.

\* \* \* \* \*